United States Patent
Kanetake

(10) Patent No.: US 7,212,526 B2
(45) Date of Patent: May 1, 2007

(54) METHOD AND APPARATUS FOR COMPOSING VIRTUAL LINKS IN A LABEL SWITCHED NETWORK

(75) Inventor: Tatsuo Kanetake, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 870 days.

(21) Appl. No.: 10/052,684

(22) Filed: Jan. 18, 2002

(65) Prior Publication Data
US 2003/0137978 A1 Jul. 24, 2003

(51) Int. Cl.
H04L 12/50 (2006.01)
(52) U.S. Cl. .................... 370/386; 370/428
(58) Field of Classification Search ............ 370/386,
370/357, 395.1, 428, 469, 60, 53, 85.14,
370/60.1, 54, 94.3, 58.2, 58.3, 466, 467,
370/474, 471, 230, 254, 389, 231, 355, 463,
370/445, 216, 229, 235, 437, 220, 221, 401,
370/486, 422, 395.32, 395.31, 399, 395.5,
370/232, 248, 252, 253, 338, 347, 388, 397,
370/400, 409, 465, 468, 396, 535, 394, 536,
370/408, 477
See application file for complete search history.

(56) References Cited

U.S. PATENT DOCUMENTS

| | | | |
|---|---|---|---|
| 5,400,324 A * | 3/1995 | Eriksson et al. ............ 370/394 |
| 5,506,840 A | 4/1996 | Pauwels et al. | |
| 5,684,961 A | 11/1997 | Cidon et al. | |
| 5,727,051 A | 3/1998 | Holender | |
| 5,764,740 A | 6/1998 | Holender | |
| 6,002,693 A | 12/1999 | Hahn | |
| 6,032,193 A | 2/2000 | Sullivan | |
| 6,049,528 A | 4/2000 | Hendel et al. | |
| 6,069,894 A | 5/2000 | Holender et al. | |
| 6,134,246 A | 10/2000 | Cai et al. | |
| 6,243,379 B1 | 6/2001 | Veerina et al. | |
| 6,278,714 B1 | 8/2001 | Gupta | |
| 6,611,532 B1 * | 8/2003 | Madour et al. ............ 370/466 |
| 6,611,872 B1 * | 8/2003 | McCanne ................ 709/238 |

(Continued)

OTHER PUBLICATIONS

Le Faucheur, IETF Multiprotocol Label Switching (MPLS) Architecture, IEEE, pp. 6-15, 1998.*
Pavlou et al, Supporting Differentiated Services in MPLS Networks, IEEE, pp. 207-215, 1999.*

(Continued)

Primary Examiner—Frank Duong
(74) Attorney, Agent, or Firm—Townsend and Townsend and Crew LLP

(57) ABSTRACT

A method for managing virtual links within a multiple protocol label switched network is provided. A virtual link which includes a set of links between two devices is regarded as a single entity by a control component of a label switching router. Each packet to be transported on the virtual link is labeled based on its assigned forwarding equivalence class. A specific label is bound to a corresponding forwarding equivalence class. Such packets can be forwarded onto any one of the links within the virtual link. To load balance the various links within the virtual link, different selected hash functions are used at selected times to apportion the packets. depending on the load conditions.

27 Claims, 9 Drawing Sheets

LSR Architecture

U.S. PATENT DOCUMENTS

| | | | |
|---|---|---|---|
| 6,944,159 B1 * | 9/2005 | Fotedar et al. | 370/392 |
| 6,977,932 B1 * | 12/2005 | Hauck | 370/392 |
| 7,012,919 B1 * | 3/2006 | So et al. | 370/392 |
| 7,023,846 B1 * | 4/2006 | Andersson et al. | 370/389 |
| 2002/0018468 A1 * | 2/2002 | Nishihara | 370/389 |
| 2002/0067725 A1 * | 6/2002 | Oguchi et al. | 370/390 |
| 2002/0097463 A1 * | 7/2002 | Saunders et al. | 359/124 |

OTHER PUBLICATIONS

Mortier et al, Switchlets and Resource-Assured MPLS Networks, Systems Research Group, pp. 1-17, May 2000.*

Avici System, Traffic Engineering with Multiprotocol Label Switching, pp. 1-28, Mar. 2000.*

* cited by examiner

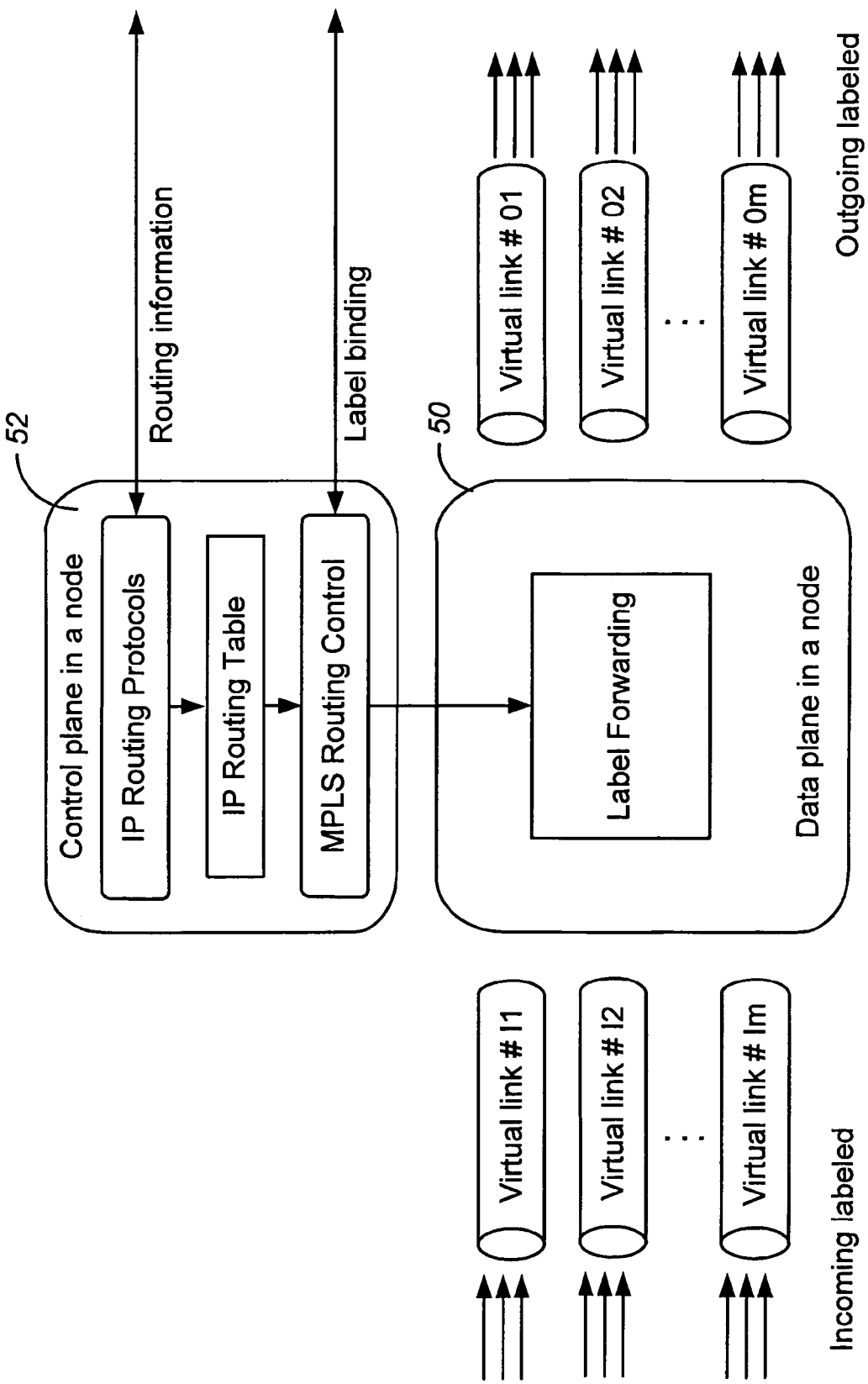
FIG. 6   LSR Architecture

| Input practical port# | Input virtual port# | Input Label | Output Label | Output virtual port# | Output practical port# |
|---|---|---|---|---|---|
| n | A | α | α' | K | f(α') |
| n | A | β | β' | K | f(β') |
| n | A | γ | γ' | X | f(γ') |
| 2 | A | δ | δ' | B | f(δ') |
| 1 | A | ε | ε' | B | f(ε') |
| 2 | A | ζ | ζ' | H | f(ζ') |
| 1 | A | η | η' | J | f(η') |
| 5 | A | σ | σ' | K | f(σ') |
| n | A | κ | κ' | X | f(κ') |

Label Forwarding Table maintained by the MPLS control plane — 90, 92, 94, 96

Label Forwarding Table and mechanism to decide practical output port at the sending LSR

*FIG. 10*

Label Forwarding Table maintained by the MPLS control plane

| Tag | Hash value of incoming label | Input practical port# | Input virtual port# | Input Label | Output Label | Output virtual port# | Output practical port# |
|---|---|---|---|---|---|---|---|
| O | $f(\alpha')$ | n | A | $\alpha'$ | $\alpha''$ | K | $f(\alpha'')$ |
| O | $f(\beta')$ | n | A | $\beta'$ | $\beta''$ | K | $f(\beta'')$ |
| O | $f(\gamma')$ | n | A | $\gamma'$ | $\gamma''$ | X | $f(\gamma'')$ |
|   | $f(\delta')$ | 2 | A | $\delta'$ | $\delta''$ | B | $f(\delta'')$ |
|   | $f(\epsilon')$ | 1 | A | $\epsilon$ | $\epsilon''$ | B | $f(\epsilon'')$ |
| O | $f(\zeta')$ | 2 | A | $\zeta$ | $\zeta''$ | H | $f(\zeta'')$ |
| O | $f(\eta')$ | 1 | A | $\eta$ | $\eta''$ | J | $f(\eta'')$ |
| O | $f(\sigma')$ | 5 | A | $\sigma$ | $\sigma''$ | K | $f(\sigma'')$ |
|   | $f(\kappa')$ | n | A | $\kappa$ | $\kappa''$ | X | $f(\kappa'')$ |

First lookup mechanism using a hash

*FIG. 11*

METHOD AND APPARATUS FOR COMPOSING VIRTUAL LINKS IN A LABEL SWITCHED NETWORK

BACKGROUND OF THE INVENTION

The present invention generally relates to multiple links within a communication span between two devices in a network. More specifically, the present invention relates to a method and apparatus for load balancing among multiple links for a next-hop device within a label switched network.

Multiple links technique is widely used as a simple way to enhance bandwidth between two communicating devices or nodes in a network. For example, in a wavelength division multiplexing network, parallel links are established using multiple wavelengths that are isolated from each other. Multiple links can be established on either physically separate media, such as several fibers and/or several wavelengths in an optical fiber, or several slots in a shared medium where some multiplexing technology is applied, such as several VC's (virtual containers) in STM (synchronous transfer module) on SONET (synchronous optical network)/SDH (synchronous digital hierarchy).

Some early methods, known as link costs tuning, were used to provide load balancing among multiple links involved changing link costs according to loading, where link costs were used in the routing algorithm to find the shortest link or path for each pair of source and destination. These methods proved to be unsatisfactory partly due to coarse granularity in adjustment and traffic oscillation resulting from inherent instability caused by delay in the feedback process.

The "Equal Cost Multipath (ECMP)" method is another method used to achieve load balancing among multiple links. In the ECMP method, no attempt is made to make dynamic adjustments to OSPF costs based on loading thereby causing the ECMP method to be reliable. If the topology is such that equal cost paths exists, then an attempt is made to divide traffic equally among the paths. The following methods of dividing traffic have been used.

The "per packet round robin forwarding" method is applicable only if the delays on the paths are almost equal. The delay difference must be small relative to packet serialization time. Delay differences greater than three times the packet serialization time can cause terrible TCP performance degradation because arrivals of incorrectly-ordered packets will trigger TCP fast retransmit, thus limiting TCP to a small window and very poor performance over long delay path.

The "source/destination hash" method was used as far back as the T1-NSFNET in the IBM RT-PC based routers. A hash function, such as CRC-16, is applied over the source address and destination address. The hash space is then split evenly among the available paths by either setting thresholds or performing a modulo operation. Traffic between any given source and destination remain on the same path.

These methods described here are based on the IP packet forwarding mechanism. Hence, they do not support any signaling mechanism to reserve resources along a route where each packet is forwarded. Neither do they support explicit routing to realize the traffic engineering. Hence, it would be desirable to provide a method and apparatus which is capable of performing load balancing without using any IP packet forwarding mechanism.

Moreover, using multiple links may incur one or more possible drawbacks. For example, degraded efficiency in link utilization may result under unbalanced traffic without load balancing. FIG. 1 illustrates this situation. Severe packet loss may occur on congested physical link #1 even if the other links, such as links #2 and #3, are unused. Without load balancing, over engineering is done to reduce packet loss within the multiple links. FIG. 2 illustrates a situation in which conventional loading balancing is performed. As shown in FIG. 2, packets belonging to the same class are forwarded into a specific one of the multiple links to help evenly distribute or balance the traffic across all the multiple links. When a packet is distributed from one physical link to another, the associated label is also changed. For example, if packet with label A in physical link #1 is re-routed onto physical link #2, the packet is given a new label A' in physical link #2.

Load balancing across multiple links generates a significant amount of processing overhead in some networks, such as, a multiple protocol label switched (MPLS) network. In a conventional MPLS network, each packet is given a label and the transport of a packet depends on its label. Packets having the same labels are treated in an identical manner, e.g., they are all routed along a previously setup label switched path or link. In this type of network, when packets are re-routed from one link to another due to, e.g., congestion, the re-routed packets need to be given new labels for transport along the new link. This need to create new labels results in a large amount of processing overhead. For example, a new label switched path need to be set up and the new label forwarding information need to be distributed to all the nodes along the new label switch path. In a MPLS network with massively parallel multiple links, load balancing may become problematic. Hence, it would also be desirable to provide a method and apparatus which is capable of performing load balancing across multiple links in a network, such as, the MPLS network while maintaining a satisfactory level of processing overhead.

Furthermore, in a MPLS network, when an incoming packet is received by a label switching router, the label associated with the incoming packet is changed or mapped to a new label for delivery to the next label switching router. This label mapping process is performed by looking up the relevant label forwarding information in an associated label forwarding table. The associated label forwarding table typically contains all the entries forwarded to the label switching router via all the multiple links. The number of entries for all the multiple links can be quite large. Consequently, the search time for the relevant label forwarding information at each label switching router may be substantial thereby delaying the label mapping process which in turn affects the transmission latency of the packets. Therefore, it would further be desirable to provide a method and apparatus which is capable of improving the transmission latency of a network, such as, the MPLS network.

SUMMARY OF THE INVENTION

According to an exemplary aspect of the present invention, a virtual link which is made up of a set of links between two devices within a label switched network is regarded as a single entity by a control component of a label switching router. Each packet to be transported on the virtual link is labeled based on its assigned class. The label given to each packet is a short, fixed length, locally significant identifier used to identify a specific class. A specific label is bound to a corresponding class. The specific label is used on packets belonging to the same class and such packets can then be forwarded onto any one of the links within the virtual link. When a packet is re-routed from one link to another within the virtual link, the label associated with that packet remains unchanged. A label distribution protocol is used to determine the route (or label switched path) for each class from an ingress node to an egress node.

Furthermore, according to another exemplary aspect of the present invention, each class can be mapped to one of the links within an outgoing virtual link without changing the output label. This mapping is performed using a selected hash function. The selected hash function is used to map the labels to integers to get a distribution on a smaller set of links in the virtual link.

In addition, according to a further exemplary aspect of the present invention, packets with different labels are apportioned among links within the virtual link. Packets with the same label (hence the same class) are forwarded onto the same link within the virtual link. In order to load balance the various links within the virtual link, different selected hash functions can be used at selected times to apportion the packets depending on the load conditions.

Finally, according to yet another exemplary aspect of the present invention, respective hash functions used at the sending and receiving label switching routers are synchronized. By synchronizing the hash functions, the number of entries in the load forwarding tables are reduced thereby reducing search time and memory storage requirements.

An exemplary embodiment of the present invention is a label switched network having a number of nodes. Each node comprises: a number of virtual links including a number of input virtual links and a number of output virtual links, each input or output virtual link having a number of individual links; a label switching router configured to receive packets having respective labels via one or more of the input virtual links and forward the received packets based on their respective labels via one or more of the output virtual links, the label switching router further including a control component configured to maintain label information relating to the labels and a forwarding component configured to perform forwarding of the received packets based on the label information.

The label switching router is identified as part of a label switched path for routing packets. With respect to the label switched path, the individual links within each input virtual link and the individual links within each output virtual link are each respectively regarded as a single entity by the control component.

Details with respect to which ones of the individual links within an output virtual link are to be used to forward the received packets are concealed from the control component. In other words, the control component forwards the packets to any one of the individual links within an output virtual link without changing the respective labels of the packets.

The label associated with a packet is composed of any one of the following entities or combination thereof including a single sequence of bits of fixed length, time slot position in a TDM frame and wavelength of optical carrier. Furthermore, each label is assigned to one of a number of forwarding equivalence classes and the labels are used by the label switching router to forward packets belonging to a corresponding class onto one of the individual links of an output virtual link.

Each node further includes control logic configured to utilize a hash function to operate on a label of a packet to be forwarded via an output virtual link to obtain a hash value, the hash value representing one of the individual links within the output virtual link that is to be used to forward the packet. By utilizing the hash function to operate on the label of the packet, the packet is capable of being forwarded to one of the individual links within the output virtual link without changing its label.

The control logic is also configured to select one of a number of hash functions to be used to operate on respective labels of packets to be forwarded via an output virtual link to obtain corresponding hash values. The respective labels correspond to one or more corresponding classes. The corresponding hash values represent one or more of the individual links within the output virtual link that are to be used to forward the packets. By selecting one of the hash functions to operate on the respective labels, the packets associated with the respective labels are apportioned among the individual links within the output virtual link. The hash function to be used to operate on the respective labels is selected based on one or more load balancing conditions.

Each node further includes a number of label forwarding tables, each label forwarding table having a number of entries, each entry including an input virtual port number, an input label, an output label and an output virtual port number. The input virtual port number represents identification information relating to an input virtual link. The input label represents label information relating to a received packet. The output label represents label information relating to an output packet and the output virtual port number represents identification information relating to an output virtual link.

Each label forwarding table is associated with one of the individual links within an input virtual link. For a first label forwarding table, an entry is tagged if a hash value of the input label for that entry is equal to an input practical port number which corresponds to an individual link within an input virtual link associated with the first label forwarding table. The first label forwarding table is modified to include only tagged entries. When a packet is received via the individual link within the input virtual link associated with the first label forwarding table, only the tagged entries within the first label forwarding table are searched for an entry corresponding to the received packet.

A number of advantages and/or benefits can be realized by the present invention. For example, by using the label distribution protocol, the label switched path determination is made independent of any IP packet forwarding mechanism and link costs used in the IP routing process to find the shortest path, thereby avoiding inherent instability and traffic oscillation associated with any IP packet forwarding mechanism. The label distribution protocol also supports explicit routing used in traffic engineering thereby enabling network design and traffic-flow optimization.

In addition, since the virtual link is regarded as one single entity, the total amount of signaling and messaging needed to establish and maintain the label switched paths is reduced thereby facilitating the support of a scalable network composed of massively parallel multiple links.

Furthermore, the present invention facilitates searching of labels of the received packets in a label forwarding table and consequently reduces the time needed to re-map labels onto multiple links at each label switching router. This, in turn, reduces delay in the feedback process and the risk of oscillation and improves the utilization of the multiple links with a faster response against data burst.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 6 is a simplified schematic diagram illustrating an architecture of a label switched router which can be used to practice the present invention;

FIG. 10 is a diagram showing an exemplary embodiment of a label forwarding table to be used by a label switched router to forward packets in accordance with the present invention; and FIG. 11 is a diagram showing another exemplary embodiment of a label forwarding table to be used by a label switched router upon receiving an incoming packet in accordance with the present invention.

DETAILED DESCRIPTION OF THE INVENTION

Figure 1:
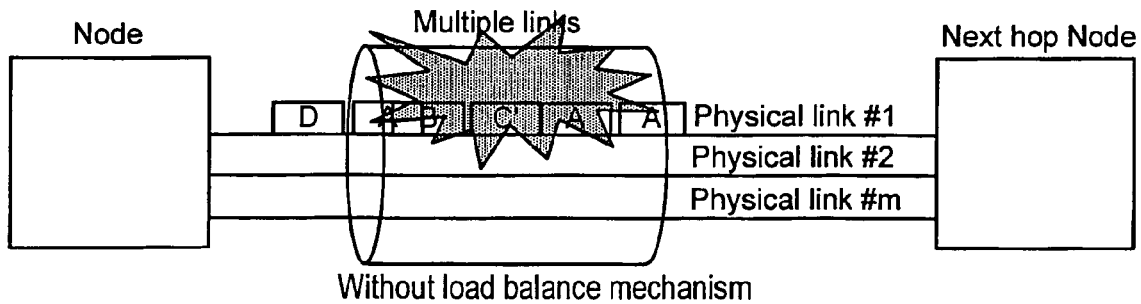
FIG. 1 is a simplified schematic diagram illustrating degraded efficiency in link utilization under unbalanced traffic without load balancing.
Figure 2:
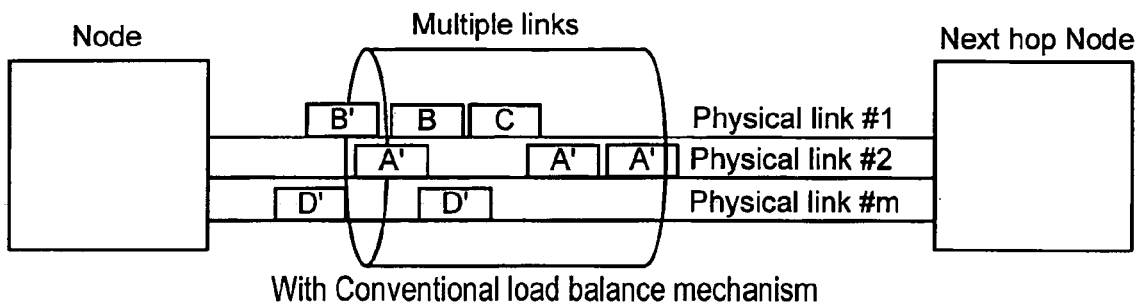
FIG. 2 is a simplified schematic diagram illustrating distributed traffic over the multiple links with load balancing.
Figure 3:
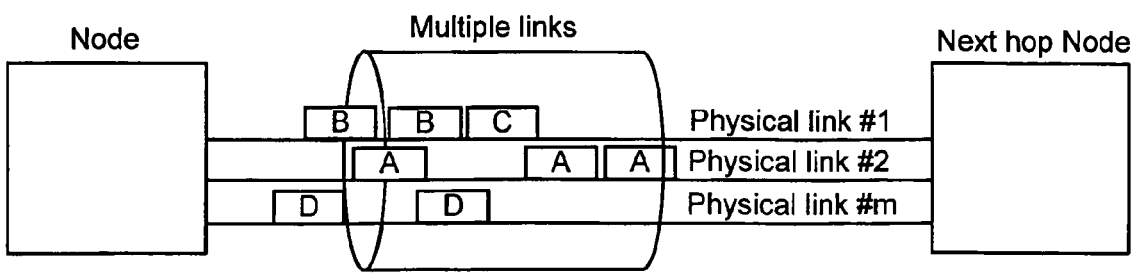
FIG. 3 is simplified schematic diagram illustrating the operation of an exemplary embodiment of the present invention.

The present invention in the form of one or more exemplary embodiments will now be described. According to an exemplary embodiment of the present invention, from a control perspective, the identification and selection of specific physical links to achieve load balancing is not material. In other words, the multiple links are treated collectively as a virtual link (i.e., a pseudo-single fat pipe) from the load balancing control viewpoint. Hence, labeling information that is established in an initial signaling process for a packet remains unchanged when the packet is distributed from one physical link to another. FIG. 3 illustrates the operation of an exemplary embodiment of the present invention. As shown in FIG. 3, when a packet with label A is re-routed from physical link #1 to physical link #2, the packet retains the same label, label A.

Figure 4:
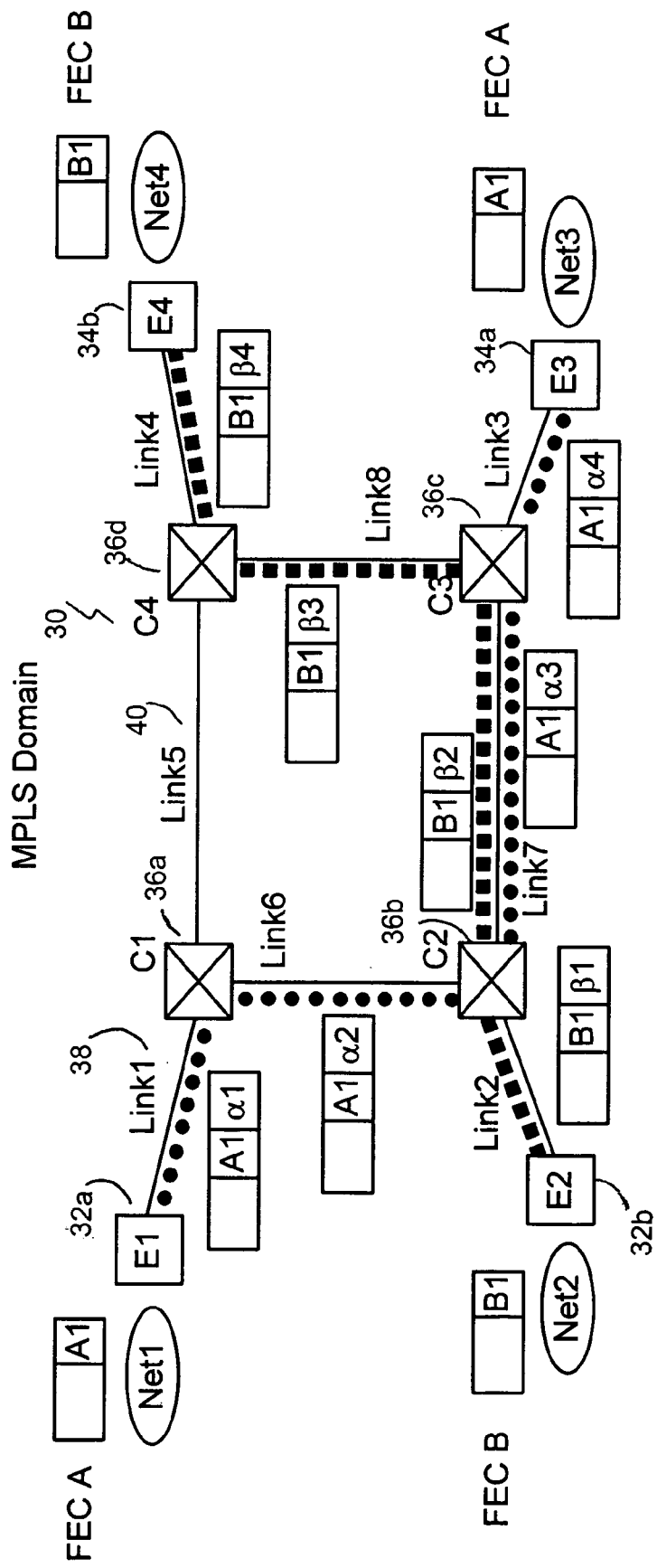
FIG. 4 is a simplified schematic diagram illustrating a multiple protocol label switched network.

In an exemplary embodiment, the present invention is applied to a multiple protocol label switched (MPLS) network. Based on the disclosure provided herein, however, it should be clear to a person of ordinary skill in the art that the present invention can be applied to other similar types of networks. FIG. 4 is a simplified schematic diagram illustrating a MPLS network 30. As shown in FIG. 4, the MPLS network 30 includes a number of label edge routers (LERs) 32 and 34 and a number of label switching routers (LSRs) 36. The LERs can be further classified into two categories, namely, ingress LERs 32a and 32b and egress LERs 34a and. 34b. It should be understood that the LERs 32 and 34 can be replaced by any nodes which respectively perform similar functions to be described below and that the LSRs 36 can be replaced by other kinds of label switching nodes, including, L3 switch, optical crossconnect, etc. Reference numeral 32 will be used herein to refer collectively to 32a and 32b. Reference numeral 34 will be used herein to refer collectively to 34a and 34b. Reference numeral 36 will be used herein to refer collectively to 36a to 36d.

The ingress LER 32a, for example, receives an IP packet with a designated destination address A1 from a source (not shown). The source is any device that is capable of transmitting IP packets, such as a client terminal or a node of a network. When the IP packet is received by the ingress LER 32a, the ingress LER 32a classifies the IP packet into a forwarding equivalence class (FEC), for example, FEC A1. The forwarding equivalence class is a representation of a group of packets that share the same requirements for their transport, i.e., all packets within the same forwarding equivalence class follow the same path through the MPLS network 30 and receive the same treatment at each LSR 36. After the IP packet is given its appropriate FEC, the ingress LER 32a labels the IP packet with an output label, for example, α1, which corresponds to the given FEC which, in this case, is FEC A1. The label associated with the IP packet may be composed of any one of the following entities or combination thereof including, for example, a single sequence of bits of fixed length, time slot position in a TDM frame and wavelength of optical carrier. The ingress LER 32a then forwards the now labeled IP packet to the LSR 36a. Similarly, the ingress LER 32b performs the same functions with respect to an IP packet having a designated destination address B1.

Upon receiving the labeled IP packet, the LSR 36a uses a label forwarding table to switch the label of the IP packet from α1 to α2. The label α2 similarly corresponds to the FEC, FEC A1, assigned to the IP packet, i.e., all packets belonging to FEC A1 are given the label α2. This labeling switching function performed by the LSR 36a is a characteristic of the MPLS network 30. Each LSR 36 maintains its own label forwarding table and its own labels for specific FECs. The label forwarding table contains input and output labeling and FEC information. This information is used to map an input label from an incoming IP packet to an output label which belongs to the same FEC. The IP packet with the output label is then forwarded by an LSR to another LSR. Therefore, the label used to encapsulate each IP packet is kept identical from the sending LSR to the receiving LSR within a link. It should be noted, however, that the label can be varied link by link. The label is characterized as an input label from the perspective of a receiving LSR, when the IP packet is received and examined by the receiving LSR; and the label is characterized as an output label from the perspective of a sending LSR, when the IP packet is sent by the sending LSR to a next hop LSR. In this example, LSR 36a, by using its label forwarding table, determines that the label α1 of the IP packet received from LER 32 (via a specific input port) corresponds to FEC A1 and consequently switches the label for the IP packet to α2 which also corresponds to FEC A1. The IP packet with the new label α2 is then sent by LSR 36a to the next LSR 36b. Hence, at each LSR 36, the label of an IP packet is switched depending on the associated local label forwarding table but the FEC of the IP packet is maintained the same throughout the transport within the MPLS network 30.

When the egress LER 34a receives the IP packet, the label α4 (which is assigned by LSR 36c) is removed and a traditional layer3 (network layer) lookup is performed for the IP packet. Based on the lookup results, the IP packet is then forwarded to the destination address A1.

The route, otherwise known as the label switched path (LSP), via which IP packets belonging to the same FEC are forwarded within the MPSL network 30 is uniquely determined at the initial label binding procedure. That is, the LSP is established prior to the start of the data packet transmission. The initial label binding procedure is done to map or bind FECs to labels and the label binding information is distributed to the LSRs 36 using a protocol, such as, the label distribution protocol (LDP) which is defined by the Internet Engineering Task Force (IETF).

Figure 5A:
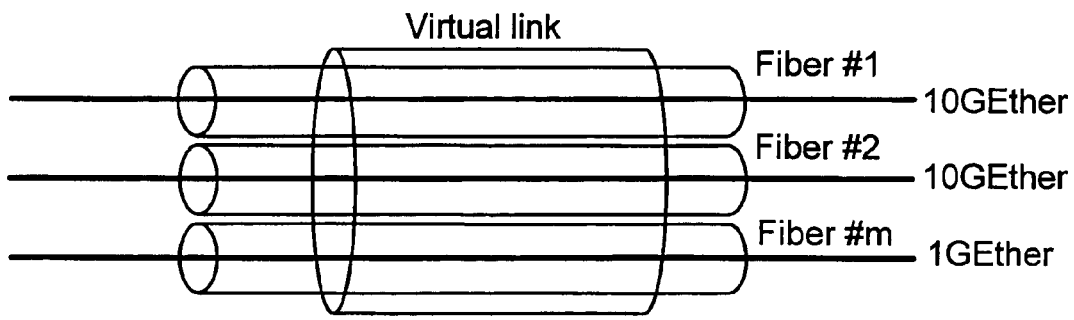
FIGS. 5a–d are simplified schematic diagrams showing various exemplary embodiments of multiple links.
Figure 5B:
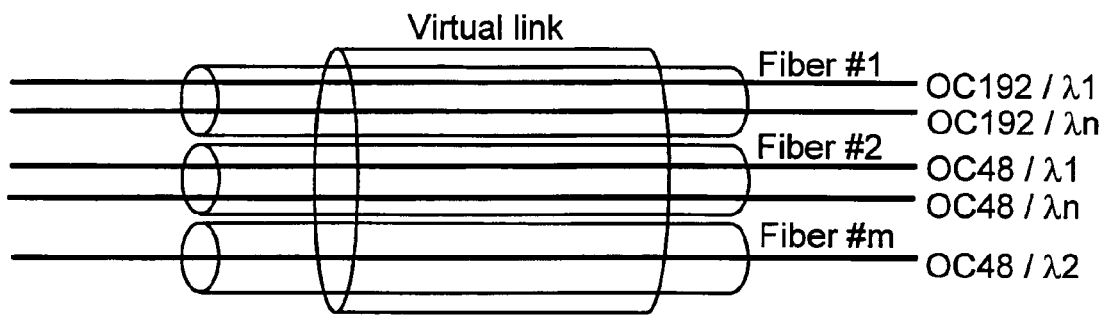
Figure 5C:
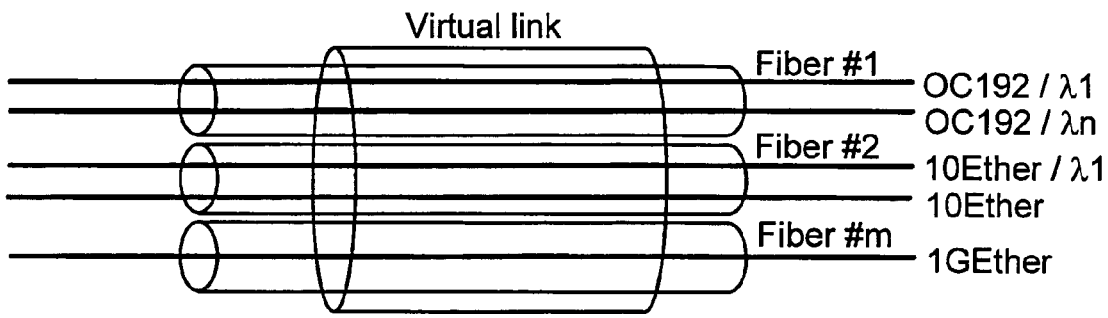
Figure 5D:
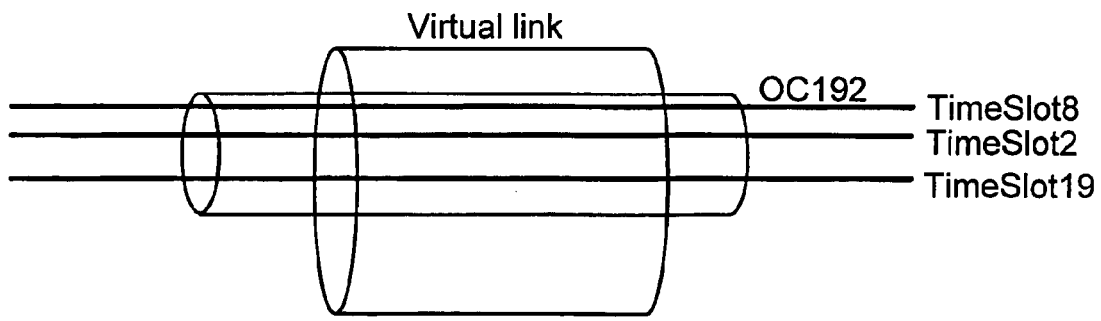

Any of the links shown in FIG. 4, for example, link1 38 between LER 32a and LSR 36a and link5 40 between LSRs 36a and 36d, may be composed of multiple links. In an exemplary embodiment, the input link(s) (i.e., a link for receiving packets) and the output link(s) (i.e., a link for forwarding packets) of a LSR 36 are each composed of multiple links. However, it should be noted that for each LSR 36, the input link(s) and the output link(s) do not both have to be composed of multiple links. For example, in an alternative embodiment, either the input link or the output link is composed of multiple links. FIGS. 4a–d show various exemplary embodiments of multiple links. Multiple links within a communication span between two devices are herein collectively referred to as a "virtual link." Referring to FIG. 5a, for example, the virtual link is shown to be composed of multiple fibers where an ether framer is used to transmit packets; in FIG. 5b, the virtual link is shown to be composed of multiple fibers where an SONET/SDH framer is used to transmit packets. Multiple framers can be used to transmit packets in one of the fibers using the wavelength division multiplexing technique. In FIG. 5c, the virtual link is shown to be composed of a combination of ether links and SONET/SDH links; and in FIG. 5d, the virtual link is shown to be composed of many logical links provided by timeslots on SONET/SDH links.

FIG. 6 illustrates an architecture of an LSR 36 which can be used to practice the present invention. Referring to FIG. 6, the architecture includes two separate components, namely, a forwarding component (also called the data plane) 50 and a control component (also called the control plane) 52. The forwarding component 50 receives data packets from a number of incoming virtual links and forwards such packets onto a number of outgoing virtual links. Each virtual link (incoming or outgoing) includes a number of individual links or multiple links. In one implementation, each link within an incoming virtual link is coupled to an input practical port which, in turn, is coupled to a network card (not shown). Similarly, each link within an outgoing virtual link is coupled to an output practical port. For each input practical port, the forwarding component 50 uses a label forwarding table or database to perform the forwarding of data packets received via that input practical port based on labels carried by the data packets. Details with respect to the label forwarding table will be provided further below.

The control component 52 is responsible for creating, maintaining and distributing label forwarding information (also referred to as bindings) among a group of interconnected LSRs along an LSP within the MPLS network 30. The label forwarding information is generated at the time the labels are created and is stored in the label forwarding tables maintained by the control component 52. Each LSR 36 distributes its label forwarding information to other LSRs 36 within the MPLS network 30. This label distribution process can also be referred to as the label binding exchange. The control component 52 also uses an IP routing table to conduct the label binding exchange, where adjacent MPLS nodes exchange labels for individual source-destination pairs that are contained within the IP routing table. In one example, the label binding exchange for destination unicast routing is performed using the IETF-defined LDP. Extensions to the base LDP have also been defined to support explicit routing and realize traffic engineering. Other protocols such as the MPLS-RSVP (Resource Reservation Protocol) and CR-LDP (Constraint-based Label Distribution Protocol) can also be used to perform the label binding exchange.

Figure 7:
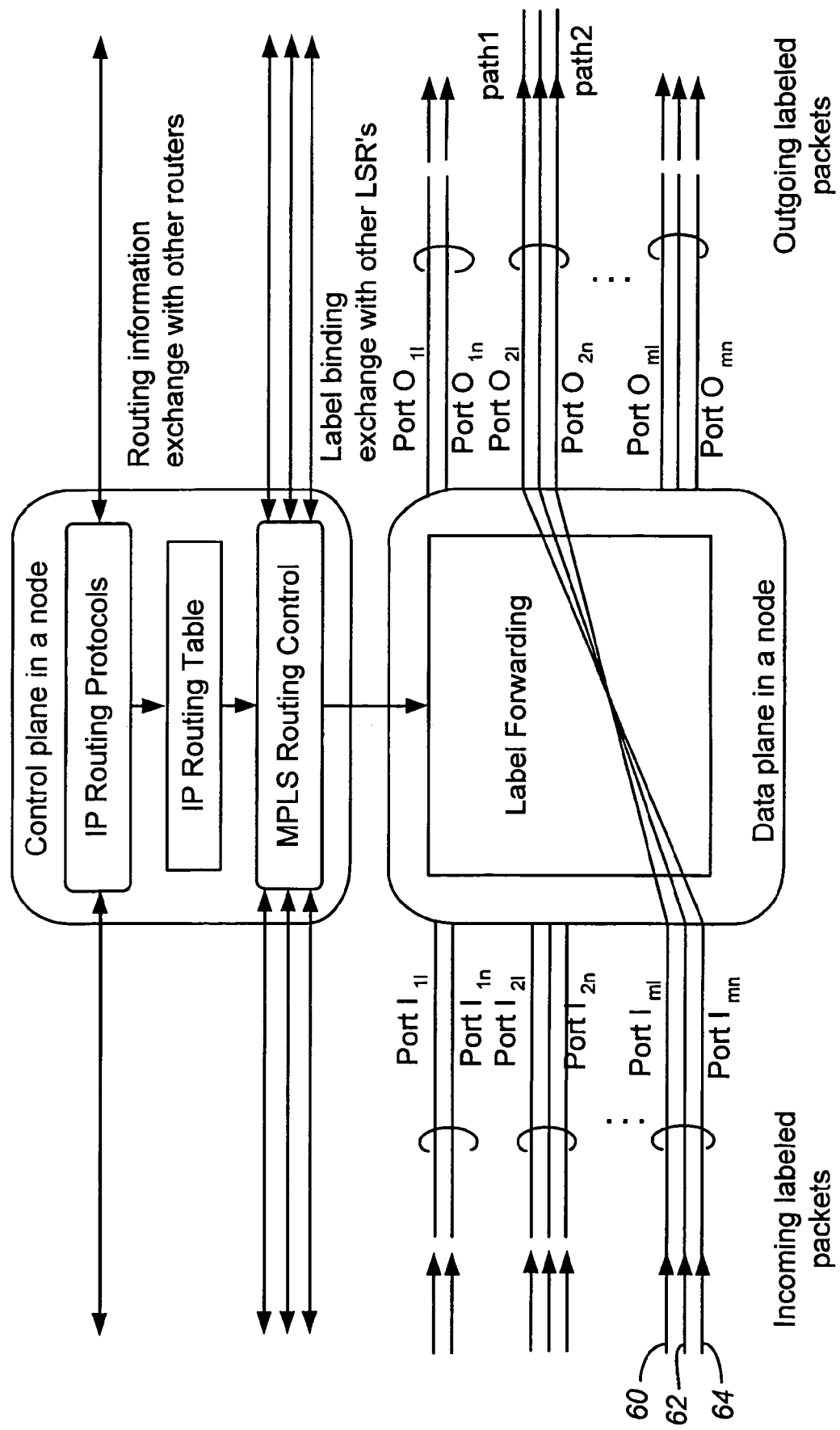
FIG. 7 is a simplified schematic diagram illustrating how multiple links are treated within the conventional architecture of the label switched router shown in FIG. 5.

FIG. 7 illustrates how multiple links are treated in a conventional manner within the architecture of the LSR 36 shown in FIG. 6. Referring to FIG. 7, each link among the multiple links is treated as a separate entity. For example, the three links 60, 62 and 64 and their respective LSPs are regarded as separate and distinct entities. For each LSP, the label distribution process and other processes for maintaining the LSP are needed.

Figure 8:
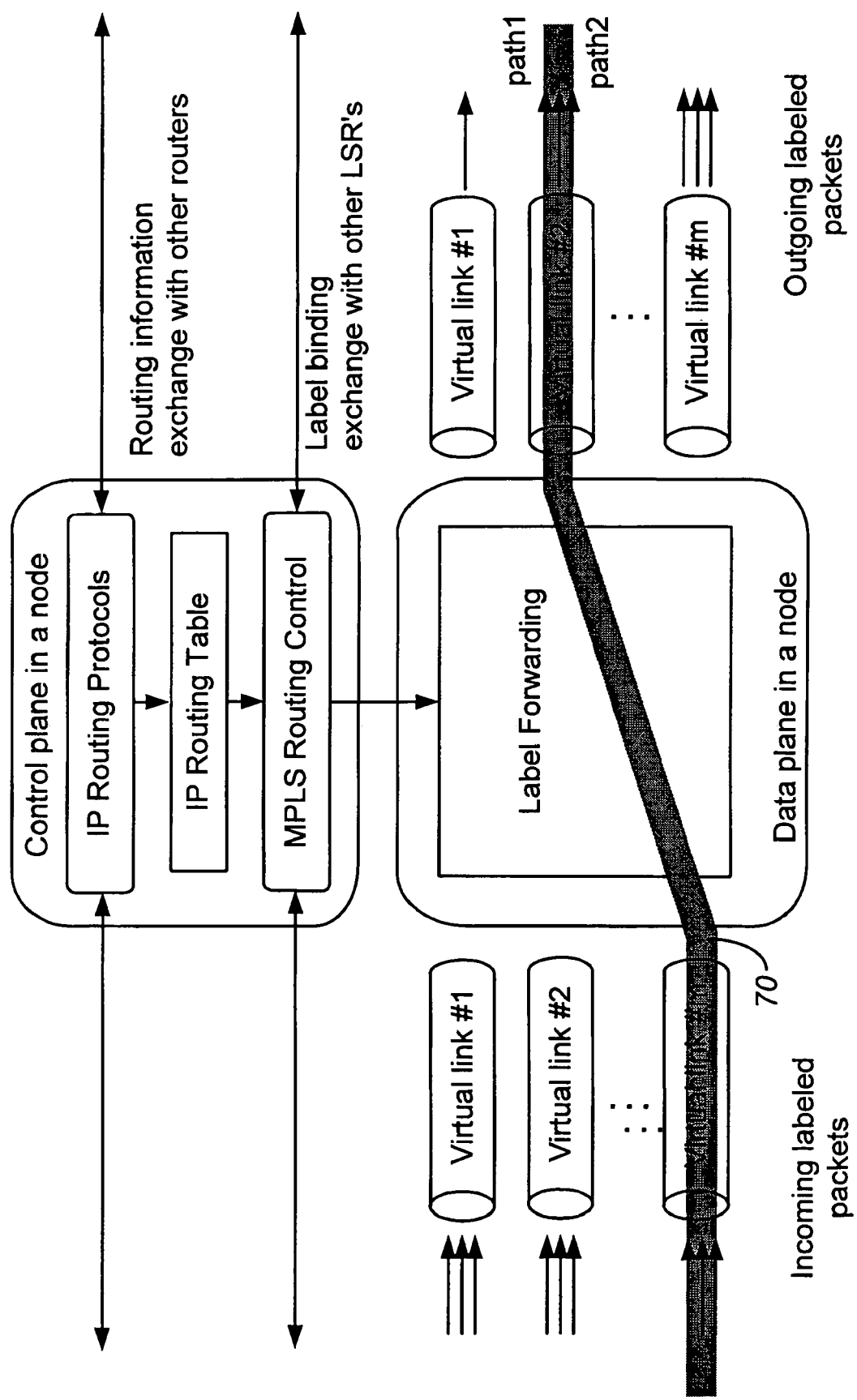
FIG. 8 is a simplified schematic diagram illustrating how multiple links are treated in accordance with an exemplary embodiment of the present invention.

According to an exemplary embodiment of the present invention, the control component 52 regards the multiple links (i.e., the virtual link) as a single entity. In other words, the details of many physical and/or logical links that make up the virtual link are concealed from the control component 52. FIG. 8 illustrates how multiple links are treated in accordance with an exemplary embodiment of the present invention. As shown in FIG. 8, the multiple links are treated as one single virtual link 70. By treating the multiple links as a single virtual link, the total amount of signaling and messaging is effectively reduced because the details of each of the physical and/or logical links making up the virtual link are not needed and one single LSP is virtually established for the entire set of multiple links. In other words, from the perspective of the control component 52, the multiple links within the virtual link 70 are regarded as a single LSP, i.e., which ones of the multiple links within the virtual link 70 are used to forward packets are concealed from the control component 52, and these multiple links are collectively established with an amount of signaling and messaging which is equivalent to that used to establish a single LSP. According to the exemplary embodiment, the label distribution process binds a common label to packets belonging to a FEC, where the common label can be used to forward packets belonging to the same FEC onto any one of the individual links within the outgoing virtual link.

Figure 9A:
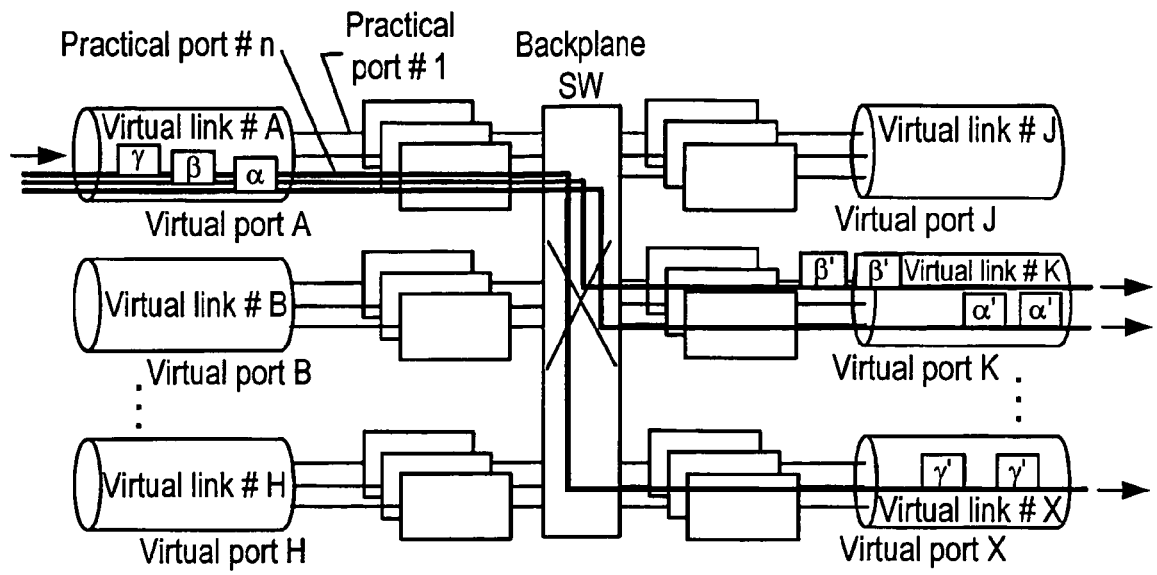
FIGS. 9a and 9b are simplified schematic diagrams illustrating exemplary embodiments of a forwarding component of a label switched router in accordance with the present invention.
Figure 9B:
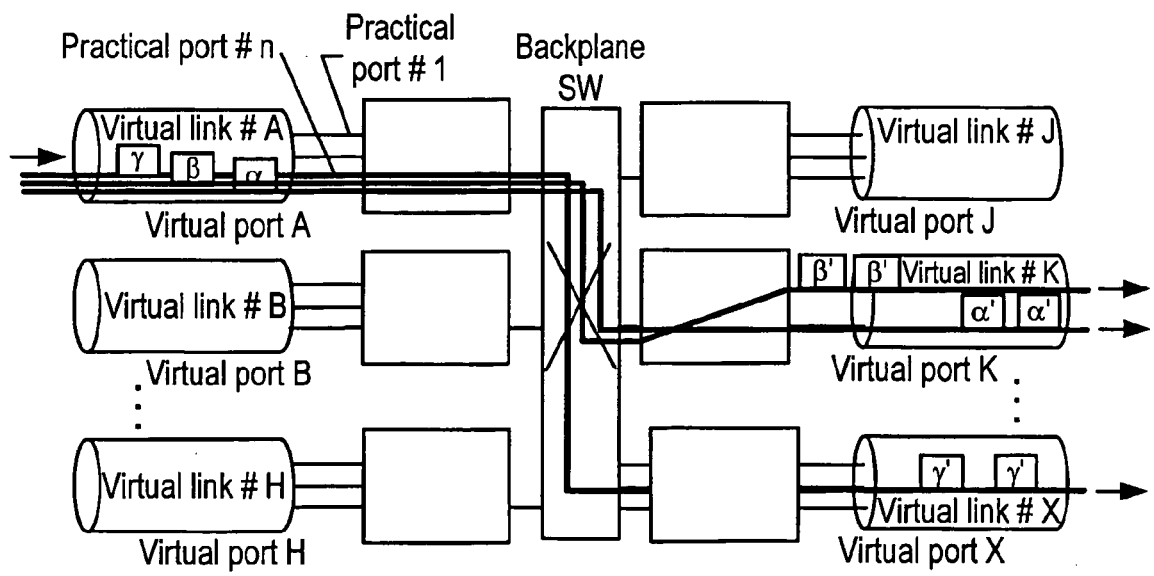

FIGS. 9a and 9b illustrate exemplary operations of the forwarding component 50 of an LSR 36 in accordance with the present invention. Referring to FIGS. 9a and 9b, the forwarding component 50 includes a number of input and output virtual ports, a number of input and output practical ports, a number of front-end and backend label forwarding modules and a backplane switch. A virtual port is considered to be a set of practical ports that is regarded as a single entity by the control component 52. Practical ports within a virtual port have their respective unique practical port numbers to be used to distinguish one practical port from the others.

Incoming virtual links are coupled to their respective input virtual ports (and their constituent input practical ports). The input practical ports, in turn, are coupled to the front-end label forwarding modules. Typically, each input practical port is coupled to a network card (not shown) which includes a corresponding front-end label forwarding module. The front-end label forwarding modules are connected to the backplane switch. The backplane switch is connected to the backend label forwarding modules which, in turn, are coupled to the output practical ports (and the output virtual ports). Finally, the output virtual ports are connected to their respective outgoing virtual links.

The forwarding component 50 operates in the following exemplary manner according to the present invention. Each input virtual port is used to receive packets from a corresponding incoming virtual link. That is, packets from an incoming virtual link, for example, virtual link A, are received by a number of input practical ports (which belong to the same input virtual port) that correspond to the individual links within the incoming virtual link. The input practical ports are coupled to a corresponding number of front-end label forwarding modules. Each front-end label forwarding module is responsible for determining which output virtual port and practical port are to be used to forward an incoming packet. Each front-end label forwarding module looks up the appropriate entry in an associated label forwarding table to make this determination. For example, the label attached to the packet and the virtual port number can be used as keys for lookup. The input virtual port through which the incoming packet is received is known. Hence, the virtual port number of the input virtual port for an incoming packet is readily available. As a result of the lookup, the virtual port number of the output virtual port which is to be used to forward the packet and the new label to be used in the virtual link to the next hop LSR are obtained. As described above, each front-end label forwarding module or an input practical port is associated with a label forwarding table, however, it should be noted that the label forwarding table can be organized in a number of ways. For example, each LSR 36 may include only one label forwarding table or several front-end label forwarding modules (handling a number of input practical ports comprising a virtual port) may share one label forwarding table. Based on the disclosure provided herein, a person of ordinary skill in the art will know of other ways to organize a label forwarding table. The lookup process will be further described below. The mechanism to determine which of the output practical ports (and its corresponding practical port number) within the output virtual port is to be used will be described below.

Using information obtained from the lookup, the front-end label forwarding module can then cause the backplane switch to switch the packet to one of the available output virtual ports. As shown in FIG. 9a, for example, the backplane switch is used to switch packets among the output practical ports within each of the output virtual ports. More specifically, incoming α, β, and γ packets are received from virtual link A via input virtual port A. After the relevant lookup information is obtained by the front-end label forwarding module, the front-end label forwarding module causes the backplane switch to split up the packets and deliver them to two separate virtual links. α and β packets (with new labels α' and β') are delivered to virtual link K via output virtual port K and γ packets (with a new label γ') are delivered to virtual link X via output virtual port X.

Furthermore, the backend label forwarding module may also perform switching functions to balance packet traffic. For example, as shown in FIG. 9b, the backend label forwarding module can have switching functions to apportion the packets among the output practical ports within the output virtual port to balance traffic to be delivered to the outgoing virtual link. As will be described further below, hash functions are used in connection with the output labels of the packets to apportion the packets amongst the various links within a virtual link to balance packet traffic.

FIG. 10 illustrates an exemplary embodiment of a label forwarding table to be used by each front-end label forwarding module of an LSR 36 to forward packets in accordance with the present invention. As mentioned above, in an exemplary embodiment, each front-end label forwarding module maintains its own label forwarding table. As shown in FIG. 10, the label forwarding table includes fields for an input virtual port number 90, an input label 92, an output label 94, and an output virtual port number 96. Information under these fields is populated initially using, for example, the LDP, at the time the labels and the LSPs are created. As previously mentioned, the label forwarding table is maintained by the control component 52 of an LSR 36.

The lookup process as mentioned above is further illustrated as follows. Referring back to FIG. 9a, for example, a packet labeled is received via virtual link A at the input virtual port A. Using the label forwarding table shown in FIG. 10, the lookup with keys of A and β from the label forwarding table results in an output virtual port number "K" and an output label "62'" to be used in the outgoing virtual link to the next hop LSR. The output virtual port number identifies the output virtual port (and the corresponding outgoing virtual link) to be used to forward the packet.

Next, the output practical port within the identified output virtual port which is to be used to forward the packet is to be determined. A pre-selected hash function is used to map the output label to an integer (or hash value) to get a distribution on a smaller set of links in the identified output virtual port. Different hash functions may be used to adapt load balancing against different variations of traffic patterns. The output practical port number is obtained by taking the hash value of the output label. As shown in FIG. 10, for example, the packet is forwarded to the output practical port with the output practical port number, $f(\beta')$, where $f(X)$ refers to the hash value of label X.

Since the control component 52 of an LSR 36 assigns an unique label to each FEC within a virtual link, the same output label is assigned to packets belonging to the same FEC. Hence, the output practical port number defined as the hash value of the output label is also unique for all packets belonging to the same FEC. Thus, all packets that belong to the same FEC use the same output practical port within each of the output virtual ports, resulting in conservation of packet order.

FIG. 11 illustrates another exemplary embodiment of a label forwarding table to be used by each front-end label forwarding module of an LSR 36 upon receiving an incoming packet in accordance with the present invention. As will be described below, the exemplary label forwarding table contains a reduced number of entries thereby reducing the amount of search time and memory requirements.

According to an exemplary embodiment of the present invention, the hash function used by a receiving LSR is synchronized to the hash function used by a sending LSR. As described above, the hash function is used to operate on an output label to obtain a corresponding output practical port number. For a packet sent from a sending LSR to a receiving LSR, the output label attached by the sending LSR is identical to the input label received by the receiving LSR. Hence, by synchronizing the respective hash functions on the sending and receiving LSRs, the receiving LSR is able to tell which one of its input practical ports is used to receive the packet because the input practical port number can be calculated as the hash value of the input label. This can be used to reduce the number of entries in the label forwarding table associated with each front-end label forwarding module connected to an input practical port.

The number of entries in a label forwarding table can be reduced as follows. Referring to FIG. 11, in addition to the information under the fields, input virtual port number 90, input label 92, output label 94 and output virtual port number 96, other information under the fields, hash value of input label 98 and input practical port number 100, is also available. The hash value of an input label can be obtained by operating a hash function on the input label; and as to the input practical port number, the front-end label forwarding module has information on the identity of its associated input practical port. Information under the "tag" field is then populated based on the following determination: for each entry, if the hash value of the input label is equal to the input practical port number, then that particular entry is marked or tagged. For example, as shown in FIG. 11, assume a practical port has a practical port number "n" and this practical port is within a virtual port having a virtual port number "A." If the hash value, $f(\beta')$, of the input label $\beta'$ is equal to the input practical port number "n," then the entry for the input label $\beta'$ is tagged. In other words, only entries having hash values corresponding to the input practical port number "n" is tagged. The label forwarding table populated in the foregoing manner is used in connection with a front-end label forwarding module receiving packets via an input practical port having an input practical port number "n." The use of tagged entries enables faster lookup. When lookup or searching is performed using this label forwarding table to retrieve the relevant label forwarding information, only the tagged entries are searched thereby reducing the amount of search time. Search on other entries is not needed because the sending LSR forwards each packet to one output practical port whose number is determined to be the hash value of the output label.

In an alternative exemplary embodiment, the label forwarding table includes only the tagged entries. By storing only the tagged entries, the size of the label forwarding table can be kept small and the amount of memory storage needed to store the label forwarding table is correspondingly reduced. Since there are many label forwarding tables within a MPLS network, with potentially one label forwarding table for each front-end label forwarding module, significant savings on memory storage can be achieved by the present invention.

In an exemplary embodiment, the present invention is implemented using software in the form of control logic in either a modular or integrated manner. However, it should be clear to a person of ordinary skill in the art that the present invention can also be implemented using hardware or a combination of hardware and software.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for managing multiple links in a label switched network, comprising:
   a plurality of wide band virtual links including a plurality of input virtual links and a plurality of output virtual links, each such virtual link including a plurality of physical links;
   a plurality of ingress nodes, each ingress node configured to receive packets and label the packets with associated labels;
   a plurality of label switching nodes, each label switching node configured to receive the labeled packets having respective associated labels via input virtual links and forward the received labeled packets based on their respective associated labels via output virtual links, each label switching node further including a control component configured to maintain label information relating to the associated labels and a forwarding component configured to perform forwarding of the received labeled packets based on the label information; and
   a plurality of egress nodes, each egress node configured to receive the labeled packets forwarded from one of the plurality of label switching nodes,
   wherein label switching nodes are identified as belonging to a label switched path and virtual links interconnect the identified label switching nodes belonging to the label switched path;
   wherein the physical links within each of the virtual links used to interconnect the identified label switching nodes are collectively regarded as a single entity by the control component with respect to the label switched path;
   wherein each associated label belongs to one of a plurality of classes;
   wherein the associated labels are used by a label switching node to forward packets belonging to a corresponding class onto one of the plurality of physical links of an output virtual link; and
   wherein a first hash function operates on an associated label of a packet to be forwarded via an output virtual link to thereby obtain a hash value, the hash value representing a physical link within the output virtual link used to forward the packet.

2. The system of claim 1 wherein by using the first hash function on the associated label of the packet, the packet is capable of being forwarded to a physical link within the output virtual link without changing its associated label.

3. The system of claim 1 further comprising:
   a plurality of label forwarding tables, each label forwarding table having a plurality of entries, each entry including an input virtual port number, an input label, an output label and an output virtual port number; and
   wherein the input virtual port number represents identification information relating to an input virtual link through which an input packet is received, the input label represents label information relating to the input packet, the output label represents label information relating to an output packet and the output virtual port number represents identification information relating to an output virtual link through which the output packet is to be forwarded.

4. The system of claim 3 wherein each label forwarding table is associated with a physical link within an input virtual link.

5. The system of claim 3 wherein a first label switching node forwards a packet to a second label switching node via a physical link within a virtual link coupling the first label switching node and the second label switching node;
   wherein the first label switching node uses the first hash function to operate on the associated label of the forwarded packet to obtain its corresponding hash value, the corresponding hash value representing the physical link within the virtual link;
   wherein for a label forwarding table associated with the physical link within the virtual link at the second label switching node, an entry is tagged if a hash value of the input label for that entry is equal to an input practical port number which corresponds to the physical link within the virtual link;

wherein the second label switching node uses a second hash function to obtain the hash value of the input label for that entry;

wherein the first hash function and the second hash function are synchronized.

6. The system of claim 5 wherein the label forwarding table associated with the physical link within the virtual link at the second label switching node is modified to include only tagged entries.

7. The system of claim 5 wherein when a packet is received via the physical link within the virtual link at the second label switching node, only the tagged entries within the label forwarding table associated with the physical link within the virtual link at the second label switching node are searched for an entry corresponding to the received packet.

8. A system for managing multiple links in a label switched network, comprising:
   a plurality of wide band virtual links including a plurality of input virtual links and a plurality of output virtual links, each such virtual link including a plurality of physical links;
   a plurality of ingress nodes, each ingress node configured to receive packets and label the packets with associated labels;
   a plurality of label switching nodes, each label switching node configured to receive the labeled packets having respective associated labels via input virtual links and forward the received labeled packets based on their respective associated labels via output virtual links, each label switching node further including a control component configured to maintain label information relating to the associated labels and a forwarding component configured to perform forwarding of the received labeled packets based on the label information; and
   a plurality of egress nodes, each egress node configured to receive the labeled packets forwarded from one of the plurality of label switching nodes,
   wherein label switching nodes are identified as belonging to a label switched path and virtual links interconnect the identified label switching nodes belonging to the label switched path;
   wherein the physical links within each of the virtual links used to interconnect the identified label switching nodes are collectively regarded as a single entity by the control component with respect to the label switched path;
   wherein each associated label belongs to one of a plurality of classes;
   wherein the associated labels are used by a label switching node to forward packets belonging to a corresponding class onto one of the plurality of physical links of an output virtual link;
   wherein one of a plurality of hash functions is used to operate on respective associated labels of packets to be forwarded via an output virtual link to obtain corresponding hash values;
   wherein the respective associated labels correspond to at least one class; and
   wherein the corresponding hash values represent physical links within the output virtual link that are to be used to respectively forward the packets.

9. The system of claim 8 wherein the hash function used to operate on the respective associated labels depends on at least one load balancing condition.

10. The system of claim 8 wherein by using one of the plurality of hash functions to operate on the respective labels, the packets associated with the respective associated labels are apportioned among the physical links within the output virtual link.

11. A system for setting label switched paths in a label switched network, comprising:
   a plurality of wide band virtual links; and
   a plurality of nodes interconnected to each other via the plurality of virtual links; and
   wherein a label switched path is identified for transmitting packets through the label switched network and the path includes virtual links and nodes; and
   wherein each node in the label switched path further includes control logic configured to select a hash function to operate on respective labels of received packets to obtain corresponding hash values, and the corresponding hash values represent physical links within the virtual link that are to be used to forward the received packets.

12. The system of claim 11 wherein each node in the label switched path is configured to receive packets having respective labels via links connected thereto and forward the received packets based on their respective labels via links connected thereto;
   wherein each node in the label switched path includes a control component configured to maintain label information relating to the labels and a forwarding component configured to perform forwarding of the received packets based on the label information; and
   wherein for a node in the label switched path, if the link to be used to forward a received packet is a virtual link, the received packet is capable of being forwarded to any of the physical links within the virtual link without changing its label that is established in an initial signaling process.

13. The system of claim 12 wherein the node in the label switched path further comprises:
   a plurality of label forwarding tables, each label forwarding table having a plurality of entries, each entry including an input virtual port number, an input label, an output label and an output virtual port number; and
   wherein the input virtual port number represents identification information relating to a virtual link used to receive the packets, the input label represents label information relating to a received packet, the output label represents label information relating to the received packet to be forwarded and the output virtual port number represents identification information relating to a virtual link used to forward the received packet.

14. The system of claim 11 wherein the label associated with a packet comprises at least one of a single sequence of bits of fixed length and wavelength of optical carrier.

15. A label switching router for use in a multiple protocol label switched network, comprising:
   a plurality of wide band virtual links including a plurality of input virtual links and a plurality of output virtual links, each virtual link including a plurality of physical links;
   a control component configured to maintain label information relating to labels carried by packets received via the input virtual links;

a forwarding component configured to perform forwarding of the received packets based on the label information via the output virtual links; and at least one label forwarding table for storing the label information, the at least one label forwarding table having a plurality of entries, each entry having an input virtual port number, an input label, an output label and an output virtual port number;

wherein the label switching router is identified as part of a label switched path for routing packets; and wherein with respect to the label switched path, the control component is capable of treating the plurality of physical links within each virtual link as a single entity, wherein a received packet has an associated input label, the associated input label corresponding to a forwarding equivalence class and an associated output label;

wherein the label switching router uses the associated input label and an input virtual port number associated with the received packet as keys to look up in the at least one label forwarding table the associated output label and an output virtual port number corresponding to an output virtual link through which the received packet is to be forwarded; and wherein a first hash function operates on the associated output label to obtain a hash value, the hash value representing an output practical port number corresponding to one of the plurality of physical links within the output virtual link through which the received packet is to be forwarded.

16. The label switching router of claim 15 wherein a second hash function is alternately operates on the associated output label to obtain a second hash value, the second hash value representing a second one of the plurality of physical links within the output virtual link through which the received packet is to be forwarded; and wherein by alternately using the first and second hash functions, different ones of the plurality of physical links within the output virtual link are capable of being selected without changing the associated output label.

17. The label switching router of claim 16 wherein by alternately using the first and second hash functions, load balancing for physical links within the output virtual link is achieved.

18. The label switching router of claim 15 wherein for each entry in the at least one label forwarding table, if a hash value of the input label associated with that entry is equal to a predetermined input practical port number, that entry is tagged;

wherein the hash value of the input label associated with that entry is obtained by using a second hash function; and wherein the first and second hash functions are synchronized.

19. The label switching router of claim 18 wherein all the tagged entries are copied and stored into an additional label forwarding table; and wherein the additional label forwarding table is associated with the predetermined input practical port number corresponding to an physical link within an input virtual link.

20. The label switching router of claim 18 wherein when a packet is received via an physical link within an input virtual link having the predetermined input practical port number, only tagged entries are searched with respect to the received packet.

21. A method for managing virtual links in a label switched network, comprising:

grouping a plurality of physical links into a plurality of wide band virtual links, each virtual link having at least two physical links, and the plurality of virtual links including a plurality of input virtual links and a plurality of output virtual links;

maintaining a plurality of ingress routers, wherein each ingress router is configured to receive packets and label the packets with associated labels;

maintaining a plurality of label switching routers within the label switched network, wherein each label switching router is configured to receive the labeled packets having respective labels from one of the plurality of ingress routers via input virtual links and forward the received labeled packets via output virtual links, each label switching router further including a control component configured to maintain label information relating to the labels and a forwarding component configured to perform forwarding of the received labeled packets based on the label information;

maintaining a plurality of egress routers, wherein each egress router is configured to receive the labeled packets forwarded by one of the plurality of label switching routers;

establishing a label switched oath having at least one label switching router for routing the labeled packets, wherein virtual links are used to interconnect the label switching routers alone the label switched path and the label switching routers along the label switched path communicate with one another via their respective control components to exchange label information to establish the label switched path;

treating the physical links within each of the virtual links being used to interconnect the label switching routers along the label switched path collectively as a single entity with respect to the label switched path, wherein the exchanged label information does not include identification of which physical links within a virtual link are to be used to forward packets;

maintaining a label forwarding table at each label switching router;

wherein the label forwarding table includes a plurality of entries, each entry including an input virtual port number, an input label, an output label and an output virtual port number;

wherein each of the labels corresponds to a class; and for a packet received via an input virtual link:
    using an input virtual port number corresponding to the input virtual link and the label of the received packet to look up an output label and an output virtual port number for the received packet in the label forwarding table, the output virtual port number corresponding to an output virtual link through which the received packet is to be forwarded; and
    using a first hash function to operate on the output label for the received packet to obtain a hash value, the hash value representing an output practical port number corresponding to physical link within the output virtual link through which the received packet is to be forwarded.

22. The method of claim 21 wherein by using the first hash function to operate on the output label for the received packet, the received packet is capable of being forwarded to one of the physical links within the output virtual link through which the received packet is to be forwarded, without changing the output label.

23. The method of claim 21 further comprising, for the packet received via the input virtual link:
- selecting one of a plurality of hash functions to operate on the output label for the received packet to obtain a hash value, the hash value representing an output practical port number corresponding to a physical link within the output virtual link through which the received packet is to be forwarded;
- wherein by having the plurality of hash functions, load balancing among the physical links within the output virtual link through which the received packet is to be forwarded is achieved.

24. The method of claim 21 further comprising:
- for each entry in the label forwarding table, tagging that entry if a hash value of the input label associated with that entry is equal to a predetermined input practical port number;
- wherein the hash value of the input label associated with that entry is obtained by using a second hash function; and
- wherein the first and second hash functions are synchronized.

25. The method of claim 24 further comprising:
- copying all the tagged entries in the label forwarding table into an additional label forwarding table; and
- associating the additional label forwarding table with the predetermined input practical port number corresponding to a physical link within an input virtual link.

26. The method of claim 24 further comprising when a packet is received via a physical link within an input virtual link having the predetermined input practical port number, searching only the tagged entries with respect to the received packet.

27. A system for setting label switched paths in a label switched network, comprising:
- a plurality of links; and
- a plurality of nodes interconnected to each other via the plurality of links;
- wherein a label switched path is identified for transmitting packets through the label switched network and includes at least one virtual link which includes at least one physical link interconnecting at least two nodes;
- wherein each node in the label switched path is configured to receive packets having respective labels via links connected thereto and to forward the received packets based on their respective labels via the links connected thereto;
- wherein each node in the label switched path includes a control component configured to maintain label information relating to the labels and a forwarding component configured to perform forwarding of the received packets based on the label information; and
- wherein for a node in the label switched path, if the link to be used to forward a received packet is a virtual link, the received packet is capable of being forwarded to any of the physical links within the virtual link without changing its label;
- wherein the node in the label switched path further includes control logic configured to select a hash function to operate on respective labels of received packets to obtain corresponding hash values; and
- wherein the corresponding hash values represent physical links within the virtual link that are to be used to forward the received packets.

* * * * *